(12) United States Patent
Yao et al.

(10) Patent No.: US 8,194,359 B2
(45) Date of Patent: Jun. 5, 2012

(54) PIEZOELECTRIC ELEMENT HAVING ETCHED PORTION TO FORM STEPPED RECESSES BETWEEN LAYERS AND MANUFACTURING METHOD THEREOF, HEAD GIMBAL ASSEMBLY, AND DISK DRIVE DEVICE WITH THE SAME

(75) Inventors: MingGao Yao, Dongguan (CN); Yu Sun, Dongguan (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 1050 days.

(21) Appl. No.: 12/153,618

(22) Filed: May 21, 2008

(65) Prior Publication Data
US 2009/0290263 A1 Nov. 26, 2009

(51) Int. Cl.
*G11B 5/56* (2006.01)
*H01L 41/22* (2006.01)
(52) U.S. Cl. .................................. 360/294.4; 29/25.35
(58) Field of Classification Search ....... 360/290–294.7; 29/25.35
See application file for complete search history.

(56) References Cited

U.S. PATENT DOCUMENTS 7,812,506 B2 * 10/2010 Shimizu et al. ............... 310/324
7,874,649 B2 * 1/2011 Matsuda et al. ................ 347/68

* cited by examiner

*Primary Examiner* — Allen Heinz
(74) *Attorney, Agent, or Firm* — Nixon & Vanderhye PC

(57) ABSTRACT

A piezoelectric element comprises a first laminated structure body and a second laminated structure body. Side surfaces of the first and the second laminated structure bodies that are parallel to a laminating direction both have at least a portion etched to form a recess so that a step distance is formed between sides of the two adjacent electrode layers that are parallel to the laminating direction. The design of the step distance increases insulation resistance between the two adjacent electrode layers on the opposite surfaces of the piezoelectric layer, and lowers reject rate. The first and the second laminated structure bodies are symmetrically laminated and bonded together, thus optimizing force balancing performance. The present invention also discloses a method of manufacturing a PZT element, a HGA with the PZT element and a disk drive unit having such HGA.

11 Claims, 15 Drawing Sheets

320a

320a

PIEZOELECTRIC ELEMENT HAVING ETCHED PORTION TO FORM STEPPED RECESSES BETWEEN LAYERS AND MANUFACTURING METHOD THEREOF, HEAD GIMBAL ASSEMBLY, AND DISK DRIVE DEVICE WITH THE SAME

FIELD OF THE INVENTION

The present invention relates to an information recording disk drive device, and more particularly, to a piezoelectric (PZT) element of the information recording disk drive device and manufacturing method of the PZT element, a head gimbal assembly (HGA), and a disk drive device.

BACKGROUND OF THE INVENTION

Disk drives are information storage devices that use magnetic media to store data and a movable read/write head positioned over the magnetic media to selectively read data from and write data to the magnetic media.

Consumers are constantly desiring greater storage capacity for such disk drive devices, as well as faster and more accurate reading and writing operations. Thus, disk drive manufacturers have continued to develop higher capacity disk drives by, for example, increasing the recording and reproducing density of the information tracks on the disks by using a narrower track width and/or a narrower track pitch. However, each increase in track density requires that the disk drive device have a corresponding increase in the positional control of the read/write head in order to enable quick and accurate reading and writing operations using the higher density disks. As track density increases, it becomes more and more difficult to quickly and accurately position the read/write head over the desired information tracks on the disk. Thus, disk drive manufacturers are constantly seeking ways to improve the positional control of the read/write head in order to take advantage of the continual increases in track density.

One approach that has been effectively used by disk drive manufacturers to improve the positional control of read/write heads for higher density disks is to employ a voice coil motor (VCM). Referring to FIG. 1a, a conventional disk drive device using VCM typically has a drive arm 104, a HGA 106 attached to and mounted on the drive arm 104, a stack of magnetic disks 101 suspending the HGA 106, and a spindle motor 102 for spinning the disks 101. The employed VCM is denoted by reference number 105 and is connected to the drive arm 104 for controlling the motion of the drive arm 104 and, in turn, controlling a slider 103 of the HGA 106 to position with reference to data tracks across the surface of the magnetic disk 101, thereby enabling the read/write head imbedded in the slider 103 to read data from or write data to the disk 101. However, because the inherent tolerances of the VCM 105 and the HGA 106 exist in the displacement of the slider 103 by employing VCM 105 alone, the slider 103 cannot achieve quick and fine position control which adversely impacts the ability of the read/write head to accurately read data from and write data to the disk 101.

In order to solve the problem, an additional actuator, for example a PZT micro-actuator, is introduced in the disk drive device in order to modify or fine tune the displacement of the slider 103. The PZT micro-actuator corrects the displacement of the slider 103 on a much smaller scale, as compared to the VCM, in order to compensate for the resonance tolerance of the VCM and/or the HGA. The micro-actuator enables, for example, the use of a smaller recording track pitch, and can increase the "tracks-per-inch" (TPI) value by 50% for the disk drive unit, as well as provide an advantageous reduction in the head seeking and settling time. Thus, the PZT micro-actuator enables the disk drive device to have a significant increase in the surface recording density of the information storage disks used therein.

Referring to FIGS. 1a and 1b, the PZT micro-actuator comprises two PZT elements denoted by reference number 120 and mounted within the HGA 106 which further includes the slider 103 and a suspension 110 to support the slider 103 and the PZT elements 120 of the micro-actuator. The suspension 110 comprises a flexure 111, a slider support 112 with a bump 112a formed thereon, a metal base 113 and a load beam 114 with a dimple 114a formed thereon. The slider 103 is partially mounted on the slider support 112 with the bump 112a supporting the center of the back surface of the slider 103. Specifically, the flexure 111 provides a plurality of traces thereon. The traces of the flexure 111 couple the slider support 112 and the metal base 113. The flexure 111 further forms a tongue region 111a for positioning the two PZT elements 120 of the micro-actuator. Referring to FIG. 1c, when a voltage is input to the two thin film PZT elements 120 of the PZT micro-actuator, one of the PZT elements may contract as shown by arrow D while the other may expand as shown by arrow E. This will generate a rotation torque that causes the slider support 112 to rotate in the arrowed direction C and, in turn, makes the slider 103 move on the disk. In such case, the dimple 114a of the load beam 114 works with the bump 112a of the slider support 112, that is, the slider 103 together with the slider support 112 rotates against the dimple 114a, which keeps the load force from the load beam 114 evenly applying to the center of the slider 103, thus ensuring the slider 103 a good fly performance, supporting the head with a good flying stability.

FIG. 2a is a plane view of the PZT elements 120 of the HGA 106 shown in FIG. 1b. FIG. 2b is a sectional view taken along line A-A of FIG. 2a. Referring to FIGS. 2a-2b, the PZT element 120 includes a left PZT element 120a and a right PZT element 120b which are arranged symmetrically. The left PZT element 120a provides two pair of electrical pads 120'a. The right PZT element 120b provides two pair of electrical pads 120'b. The surface of the left PZT element 120a and the right PZT element 120b are coated with resin 121. The resin 121 comprises an adhesive connection portion 121'. The adhesive connection portion 121' is positioned between the left PZT element 120a and the right PZT element 120b in order to physically connect the left PZT element 120a and the right PZT element 120b. The two PZT elements 120a, 120b both have a first electrode-piezoelectric combination structure and a second electrode-piezoelectric combination structure. The first electrode-piezoelectric combination structure is connected with the second electrode-piezoelectric combination structure by adhesive. Specifically, the first electrode-piezoelectric combination structure comprises a first PZT layer 123, a first electrode layer 122 and a second electrode layer 124 which are laminated on two opposite surfaces of the PZT layer 123. The second electrode-piezoelectric combination structure comprises a second PZT layer 127, a third electrode layer 126 and a fourth electrode layer 128 which are laminated on two opposite surfaces of the PZT layer 127. An adhesive layer 125 bonds the second electrode layer 124 and the third electrode layer 126 thus to connect the first electrode-piezoelectric combination structure and a second electrode-piezoelectric combination structure together. One pair of the electrical pads 120'a/120'b of the left/right PZT element 120a/120b are respectively positioned on the first electrode layer 122 of the first electrode-piezoelectric combination structure and the fourth electrode layer 128 of the second electrode-piezoelectric combination structure of the left/right PZT element 120a/120b. The other pair of the electrical pads 120'a/120'b of the left/right PZT element 120a/120b are respectively positioned on the second electrode layer 124 of the first electrode-piezoelectric combination structure and the third electrode layer 126 of the second electrode-piezoelectric combination structure of the left/right PZT element 120a/120b.

FIGS. 3a-3h illustrate the prior method of manufacturing the PZT element 120a/120b. As shown in FIG. 3a, the first electrode layer 122, the first PZT layer 123 and the second electrode layer 124 are sequentially laminated on a first substrate 155. The fourth electrode layer 128, the second PZT layer 127 and the third electrode layer 126 are sequentially laminated on a second substrate 166. As shown in FIG. 3b, the adhesive layer 125 bonds the second electrode layer 124 and the third electrode layer 126 thus to form multiple layers of electrode-piezoelectric combination structures. As shown in FIG. 3c, the first substrate 155 is removed. Herein removing the first substrate 155 could be performed by chemical etching process or photolithography process or ion sputtering method. As shown in FIG. 3d, the multiple layers of electrode-piezoelectric combination structures are proceeded with shape processing treatment on the second substrate 166 using photolithography process or etching process to form initial left/right PZT element of predetermined shape. At the same time, the first electrode layer 122, the second electrode layer 124, the third electrode layer 126 and the fourth electrode layer 128 respectively forms a electrical pad 120'a/120'b (not shown). As shown in FIGS. 3e-3f, the resin 121 covers the surface of the initial left/right PZT element, and the adhesive connection portion 121' of the resin 121 bonds between the initial left and right PZT elements. As shown in FIGS. 3g-3h, the second substrate 166 is removed and thus the left, right PZT element 120a, 120b with two PZT layer 123, 127 are formed. As shown, the PZT element 120 has the left PZT element 120a and the right PZT element 120b which are connected together.

However, the PZT element 120a/120b manufactured by above-mentioned method has a small insulation resistance, a high reject rate and a high manufacture cost. The following will take the first electrode-piezoelectric combination structure as an example to illustrate the reason. Because of the restriction of the manufacturing process, especially limitation of chimerical etching control and contamination control, the sides of the first electrode layer 122 and the second electrode layer 124, which are parallel to the laminating direction of the first electrode-piezoelectric combination structure, are aligned up-and-down. This causes the insulation resistance between the first electrode layer 122 and the second electrode layer 124 of the first PZT layer 123 small, thereby the reject rate of PZT element is high and the manufacture cost is high. The same problems also occur in the second electrode-piezoelectric combination structure.

Hence, it is desired to provide an improved PZT element and manufacturing method thereof, a head gimbal assembly with the PZT element, a disk drive unit with the head gimbal assembly to solve the above-mentioned problems.

SUMMARY OF THE INVENTION

Accordingly, an object of the present invention is to provide a piezoelectric element which possesses higher insulation resistance.

Another object of the present invention is to provide a method of manufacturing a piezoelectric element. The method could not only manufacture a piezoelectric element with higher insulation resistance, but also manufacture the piezoelectric element with low reject rate and low manufacture cost.

Another object of the present invention is to provide a head gimbal assembly with a piezoelectric element, the piezoelectric element of the head gimbal assembly possesses higher insulation resistance and a better operation performance.

Still another object of the present invention is to provide a disk drive unit, a piezoelectric element of the disk drive unit possesses higher insulation resistance and a better operation performance.

To achieve the above-mentioned objects, a piezoelectric element comprises a first laminated structure body and a second laminated structure body. The first and the second laminated structure bodies are both laminated by electrode layer and piezoelectric layer alternately to define a laminating direction, and each piezoelectric layer is sandwiched between two adjacent electrode layers. Side surfaces of the first and the second laminated structure bodies that are parallel to the laminating direction both have at least a portion etched to form a recess so that a step distance is formed between sides of the two adjacent electrode layers that are parallel to the laminating direction. The first and the second laminated structure bodies are symmetrically laminated and bonded together.

In the invention, the side surfaces of the first and the second laminated structure bodies are etched into step-shaped surfaces or wave-shaped surfaces or inclined surfaces.

As an embodiment of the present invention, the recess is filled with insulation resin therein.

Preferably, the range of the step distance is from 0.5 micrometers to 10 micrometers.

A method of manufacturing a piezoelectric element comprises steps of: (1) forming a first laminated structure body by laminating electrode layer and piezoelectric layer alternately in a laminating direction, wherein each piezoelectric layer is sandwiched between two adjacent electrode layers; (2) etching a side surface of the first laminated structure body that is parallel to the laminating direction to form a recess so that a step distance is formed between sides of the two adjacent electrode layers that are parallel to the laminating direction; (3) forming a second laminated structure body by the same steps as the step (1) and the step (2); (4) face-to-face and symmetrically laminating the first laminated structure body and the second laminated structure body together, and bonding the first laminated structure body and the second laminated structure body.

As an embodiment of the present invention, the method of manufacturing a piezoelectric element further comprises a step of filling the recess with insulation resin.

As another embodiment of the present invention, the side surface is etched into step-shaped surface or wave-shaped surface or inclined surface in the step (2).

Preferably, the etching is performed by chemical etching or iron sputtering.

Also preferably, the range of the step distance is from 0.5 micrometers to 10 micrometers.

A piezoelectric element comprises at least one laminated structure body. The laminated structure body is laminated by electrode layer and piezoelectric layer laminated alternately to define a laminating direction, and each piezoelectric layer is sandwiched between two adjacent electrode layers. Side surface of the laminated structure bodies that is parallel to the laminating direction has at least a portion etched to form a recess so that a step distance is formed between sides of the two adjacent electrode layers that are parallel to the laminating direction.

A head gimbal assembly comprises a slider, a PZT micro-actuator and a suspension to support the slider and the PZT micro-actuator. The PZT micro-actuator comprises at least one pair of piezoelectric elements, and each piezoelectric element comprises a first laminated structure body and a second laminated structure body. The first and the second laminated structure bodies are both laminated by electrode layer and piezoelectric layer alternately to define a laminating direction, and each piezoelectric layer is sandwiched between two adjacent electrode layers. Side surfaces of the first and the second laminated structure bodies that are parallel to the laminating direction both have at least a portion etched to form a recess so that a step distance is formed between sides of the two adjacent electrode layers that are parallel to the laminating direction. The first and the second laminated structure bodies are symmetrically laminated and bonded together.

A disk drive unit comprises a head gimbal assembly, a drive arm connected to the head gimbal assembly, a disk and a spindle motor to spin the disk. The head gimbal assembly comprises a slider, a PZT micro-actuator and a suspension to support the slider and the PZT micro-actuator. The PZT micro-actuator comprises at least one pair of piezoelectric elements, and each piezoelectric element comprises a first laminated structure body and a second laminated structure body. The first and the second laminated structure bodies are both laminated by electrode layer and piezoelectric layer alternately to define a laminating direction, and each piezoelectric layer is sandwiched between two adjacent electrode layers. Side surfaces of the first and the second laminated structure bodies that are parallel to the laminating direction both have at least a portion etched to form a recess so that a step distance is formed between sides of the two adjacent electrode layers that are parallel to the laminating direction. The first and the second laminated structure bodies are symmetrically laminated and bonded together.

In comparison with the prior art, the side surfaces of the first and the second laminated structure bodies of the piezoelectric element that are parallel to the laminating direction both have at least a portion etched to form a recess so that a step distance is formed between sides of the two adjacent electrode layers that are parallel to the laminating direction. Therefore, compared with the aligned up-and-down sides of the two adjacent electrodes, the present invention increases insulation resistance between two adjacent electrodes on the opposite surfaces of the piezoelectric layer, which in turn, reduces reject rate of the piezoelectric element and lowers manufacture cost. In addition, because the first and the second laminated structure bodies are symmetrically laminated and bonded together, the piezoelectric element has a sound force balancing performance, which further optimizes mechanical performance of the piezoelectric element. Besides, the recesses of the first and the second laminated structure bodies are filled with insulation resin therein, which further increases insulation resistance between the two adjacent electrode layers on the opposite surfaces of the piezoelectric layer.

Other aspects, features, and advantages of this invention will become apparent from the following detailed description when taken in conjunction with the accompanying drawings, which are a part of this disclosure and which illustrate by way of example, principles of this invention.

BRIEF DESCRIPTION OF THE DRAWINGS

The accompanying drawings facilitate an understanding of the various embodiments of this invention. In such drawings:

FIG. 1b is an exploded, perspective view of a head gimbal assembly of the disk drive unit shown in FIG. 1a;

FIG. 2b is a sectional view taken along line A-A of FIG. 2a;

FIG. 2c is a sectional view taken along line B-B of FIG. 2a;

FIG. 4b is a sectional view of inner structure of the piezoelectric element of FIG. 4a;

DETAILED DESCRIPTION OF ILLUSTRATED EMBODIMENTS

Figure 1A:
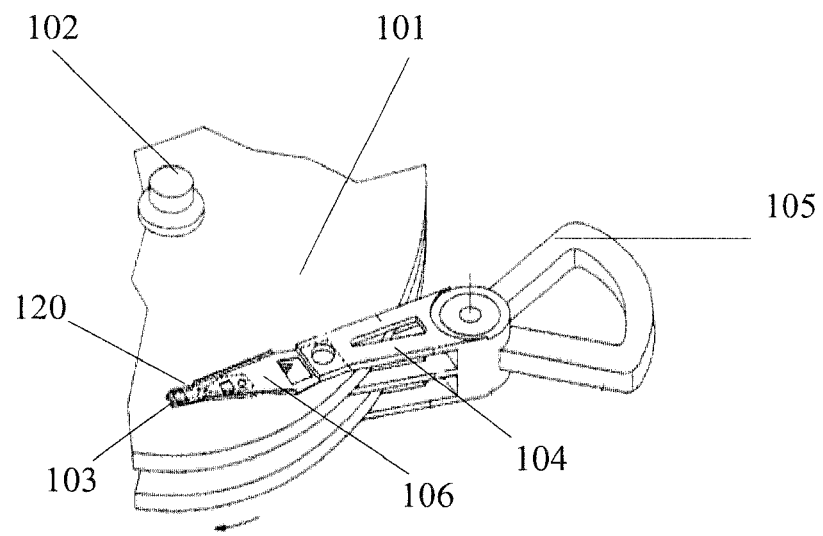
FIG. 1a is a perspective view of a conventional disk drive unit.
Figure 1B:
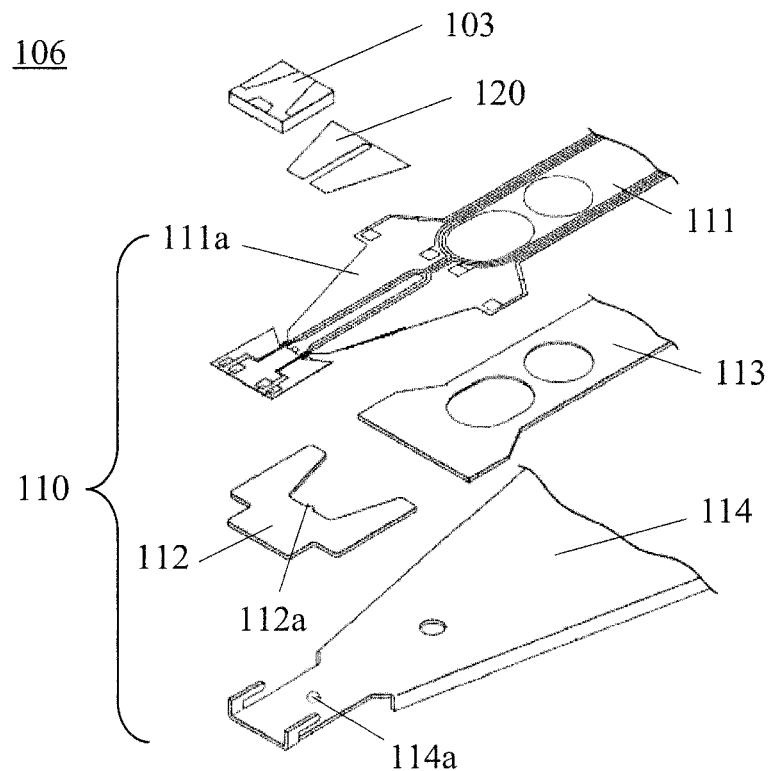
Figure 1C:
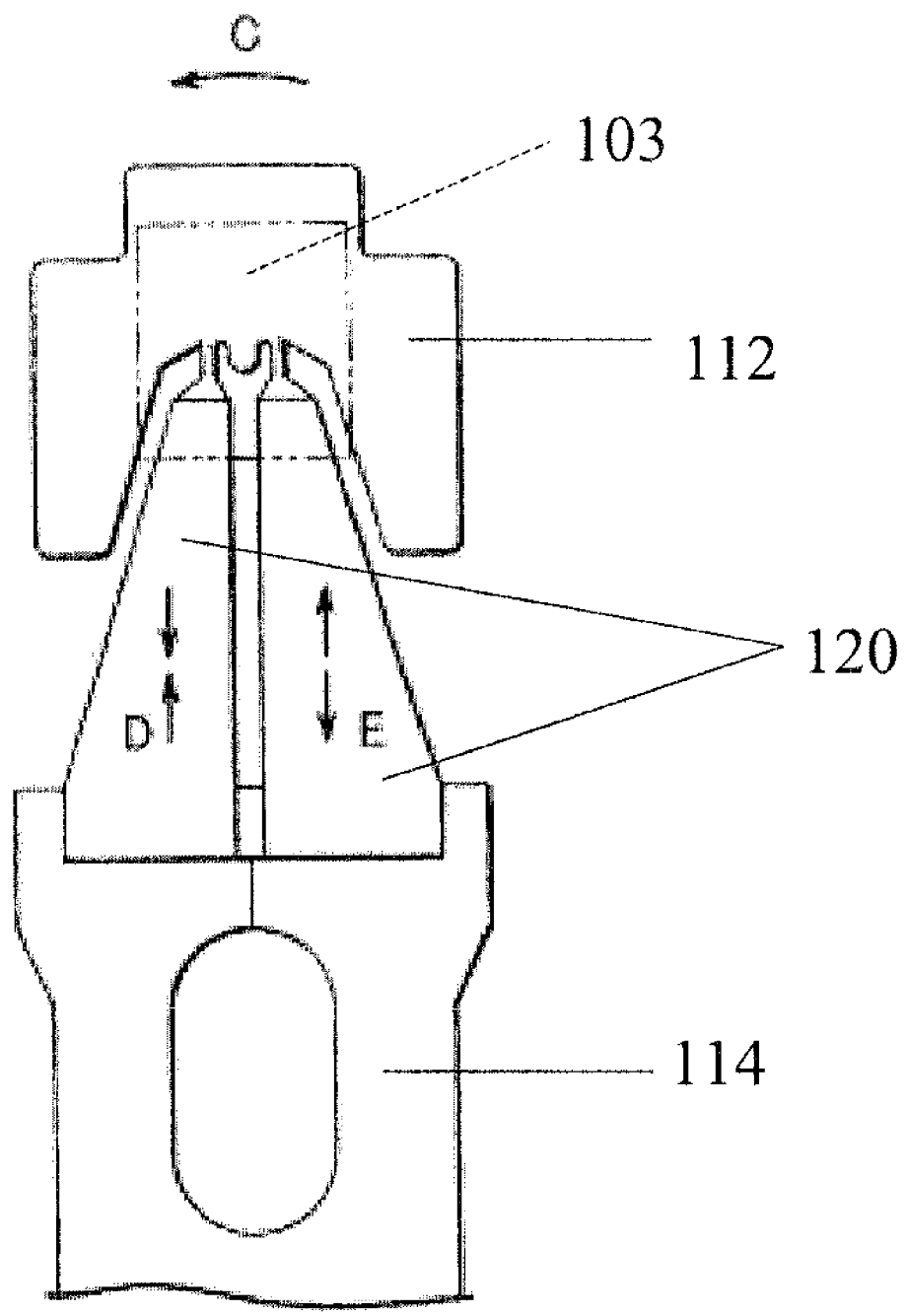
FIG. 1c is a partial top view of the head gimbal assembly shown in FIG. 1b after assembled, illustrating the operation principle of the head gimbal assembly.
Figure 2A:
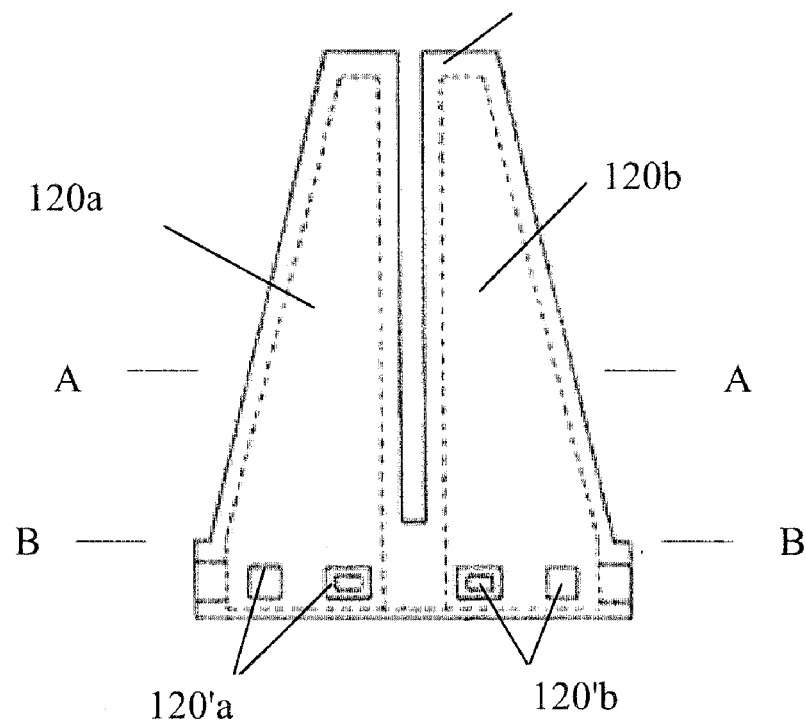
FIG. 2a is a plane view of a piezoelectric element of the head gimbal assembly shown in FIG. 1b.
Figure 2B:
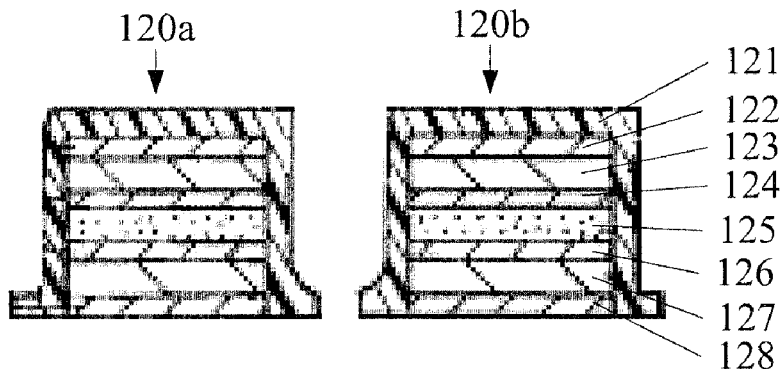
Figure 2:
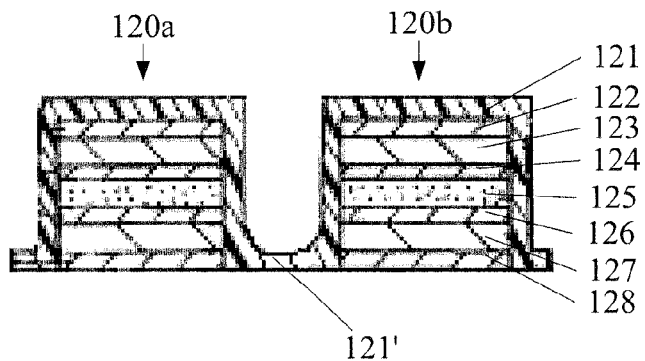
Figure 3:
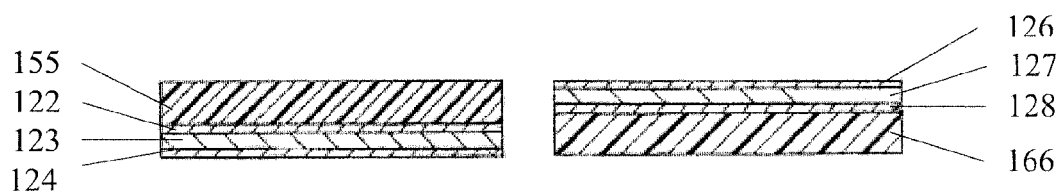
FIGS. 3c-3h show a method of manufacturing the piezoelectric element of the prior art.
Figure 3:
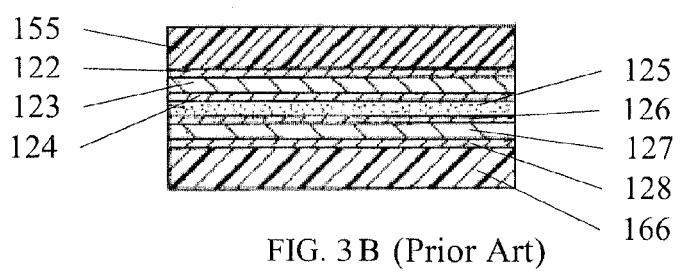
Figure 3:
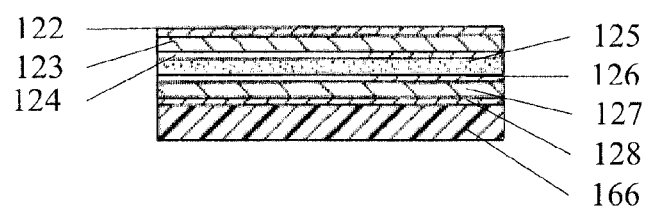
Figure 3:
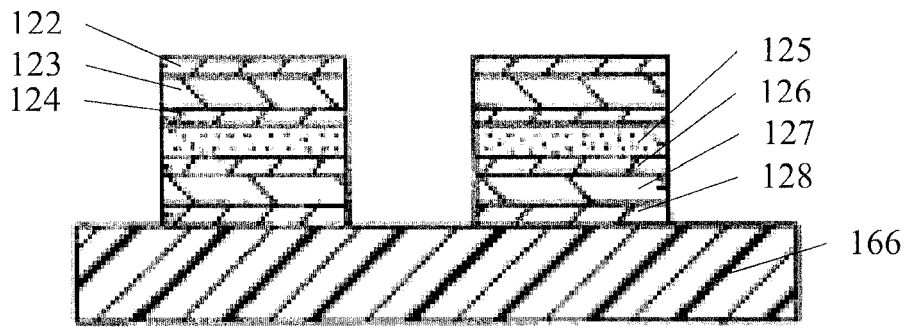
Figure 3:
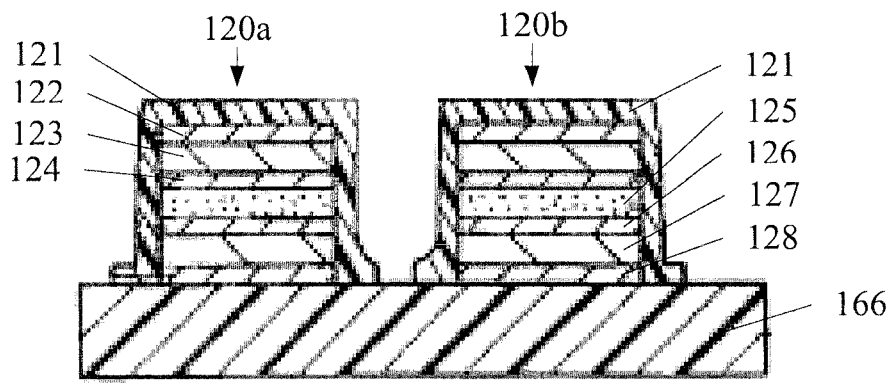
Figure 3:
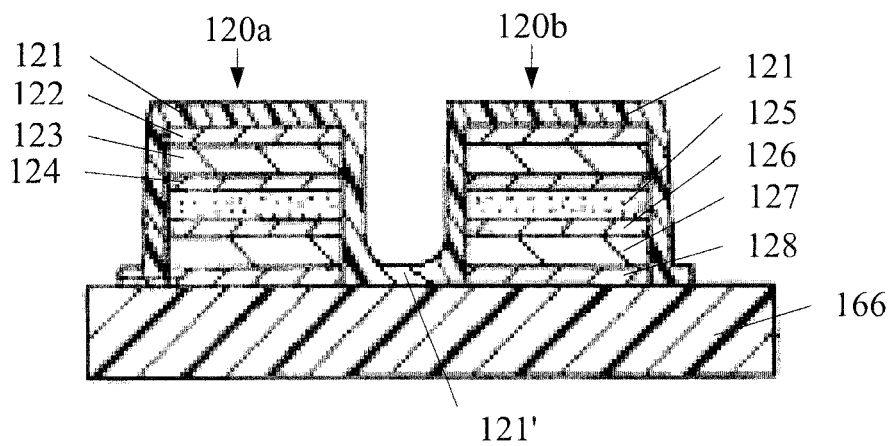
Figure 3G:
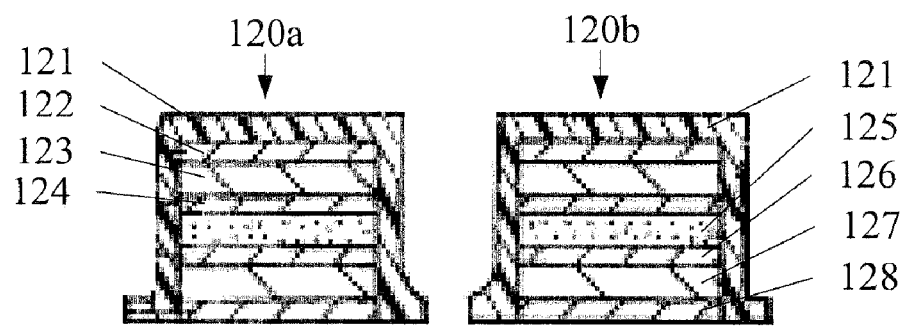
Figure 3H:
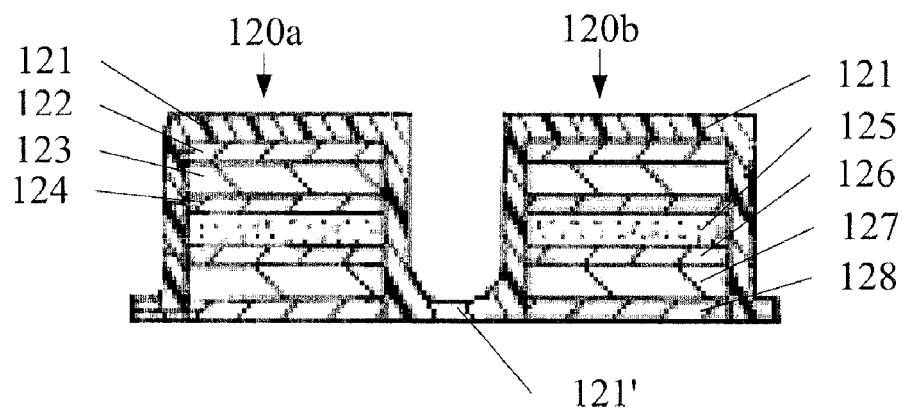
Figure 4A:
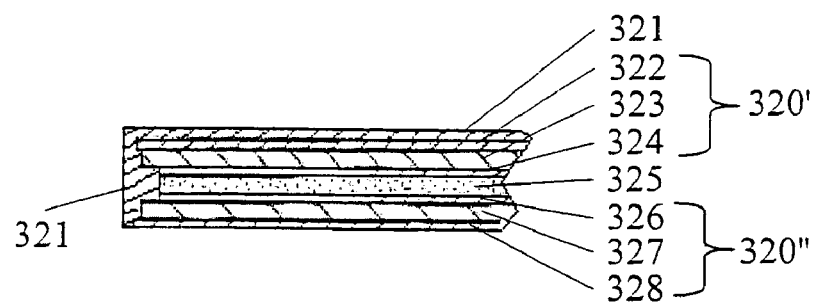
FIG. 4a is a sectional view of a piezoelectric element according to a first embodiment of the present invention.
Figure 4B:
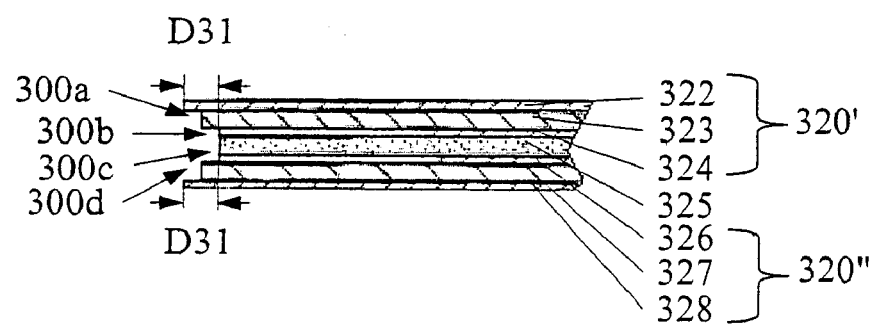

Various preferred embodiments of the invention will now be described with reference to the figures, wherein like reference numerals designate similar parts throughout the various views. FIG. 4a is a sectional view of a first embodiment of a piezoelectric element 320a according to the present invention. FIG. 4b is a sectional view of inner structure of the piezoelectric element 320a of FIG. 4a. As shown, the piezoelectric element 320a comprises a first laminated structure body 320' and a second laminated structure body 320". The first and the second laminated structure bodies 320', 320" are both laminated by electrode layer and piezoelectric layer alternately to define a laminating direction, and each piezoelectric layer is sandwiched between two adjacent electrode layers.

The first laminated structure body 320' comprises a first piezoelectric layer 323, a first electrode layer 322 and a second electrode layer 324 which are positioned on two opposite surfaces of the first piezoelectric layer 323. The side surface of the first laminated structure body 320' that is parallel to the laminating direction has a portion etched to form a recess so that a step distance D31 is formed between sides of the first electrode layer 322 and the second electrode layer 323 that are parallel to the laminating direction. The range of the step distance D31 is from 0.5 micrometers to 10 micrometers. In the subject embodiment, the side surface of the first laminated structure body 320' is etched into step-shaped surface. Specifically, after etched, the first electrode layer 322 together with the first piezoelectric layer 323 forms a step 300a on the side surface, the first piezoelectric layer 323 together with the second electrode layer 324 forms a step 300b on the side surface. The existence of the step distance D31 increases insulation resistance between the adjacent electrode layers 322, 324 on the two opposite surfaces of the piezoelectric layer 323, thus lowers reject rate and reduces manufacture cost.

The second laminated structure body 320" comprises a second piezoelectric layer 327, a third electrode layer 326 and a fourth electrode layer 328 which are positioned on two opposite surfaces of the second piezoelectric layer 327. The side surface of the second laminated structure body 320" that is parallel to the laminating direction also has a portion etched to form a recess so that a step distance D31 is formed between sides of the third electrode layer 326 and the fourth electrode layer 328 that are parallel to the laminating direction. In the subject embodiment, the side of the second laminated structure body 320" is etched into step-shaped surface. Specifically, after etched, the third electrode layer 326 together with the second piezoelectric layer 327 forms a step 300c on the side surface, the second piezoelectric layer 327 together with the fourth electrode layer 328 forms a step 300d on the side surface. The existence of the step distance D31 increases insulation resistance between the adjacent electrode layers 326, 328 on the two opposite surfaces of the piezoelectric layer 327, thus lowers reject rate and reduces manufacture cost.

The first and the second laminated structure bodies 320', 320" are symmetrically laminated and bonded together. Specifically, the second electrode layer 324 of the first laminated structure body 320' and the third electrode layer 326 of the second laminated structure body 320" are bonded by adhesive 325 in order to symmetrically laminate the first and second laminated structure 320', 320" together. The design of symmetrical lamination of the first laminated structure body 320' and the second laminated structure 320" enhances force balancing performance of the piezoelectric element and optimizes mechanical performance of the piezoelectric element.

The recess formed by the first laminated structure body 320' and the second laminated structure body 320" after etched are filled with insulation resin 321. The insulation resin 321 filled in the recess also increases insulation resistance between the two adjacent electrode layers 322/326, 324/328 on the opposite surfaces of the piezoelectric layer 323/327. In addition, the surfaces of the first laminated structure body 320' and the second laminated structure body 320" are also covered with insulation resin 321.

Figure 5A:
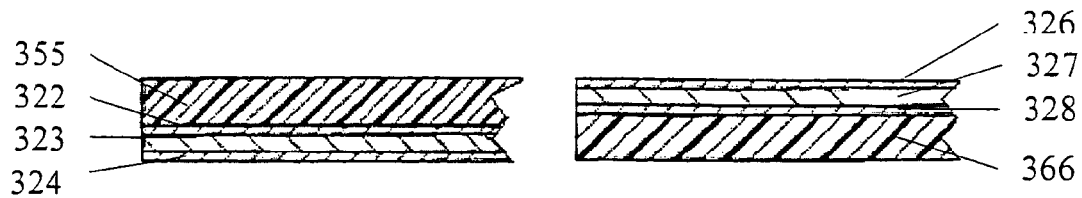
FIGS. 5a-5f show a method of manufacturing a piezoelectric element according to the present invention.
Figure 5B:
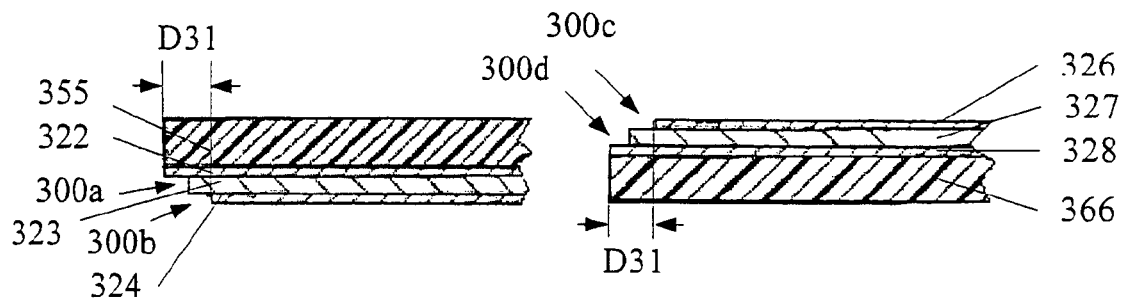
Figure 5C:
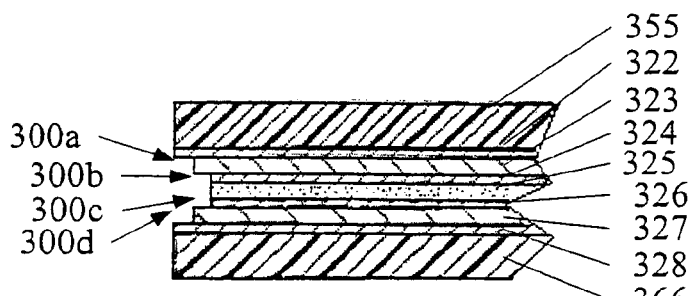
Figure 5D:
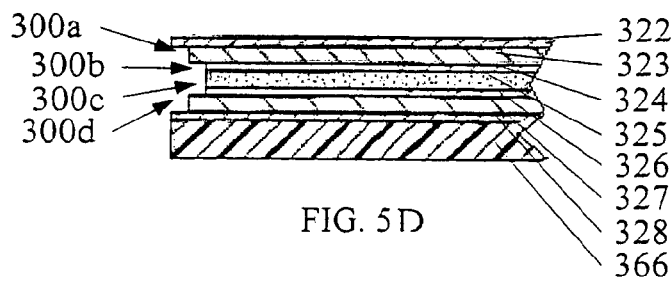
Figure 5E:
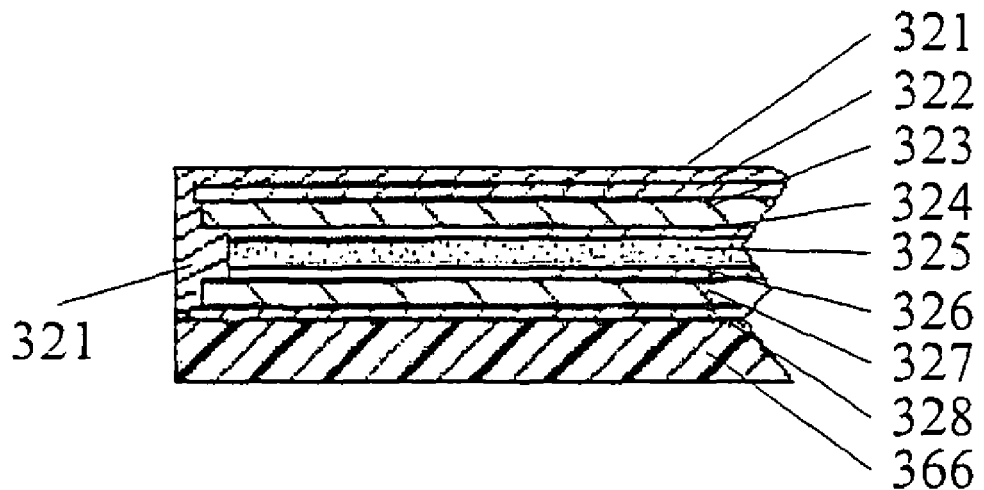
Figure 5F:
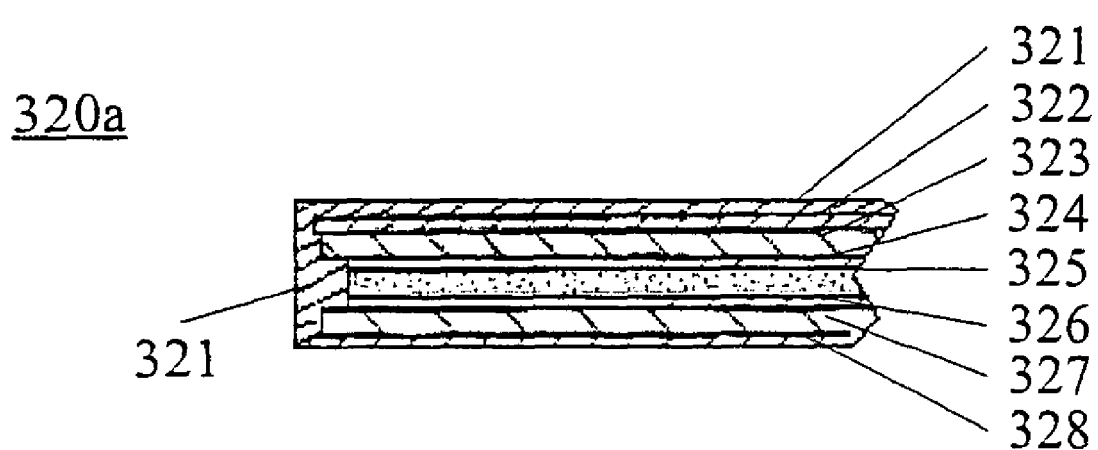
Figure 6:
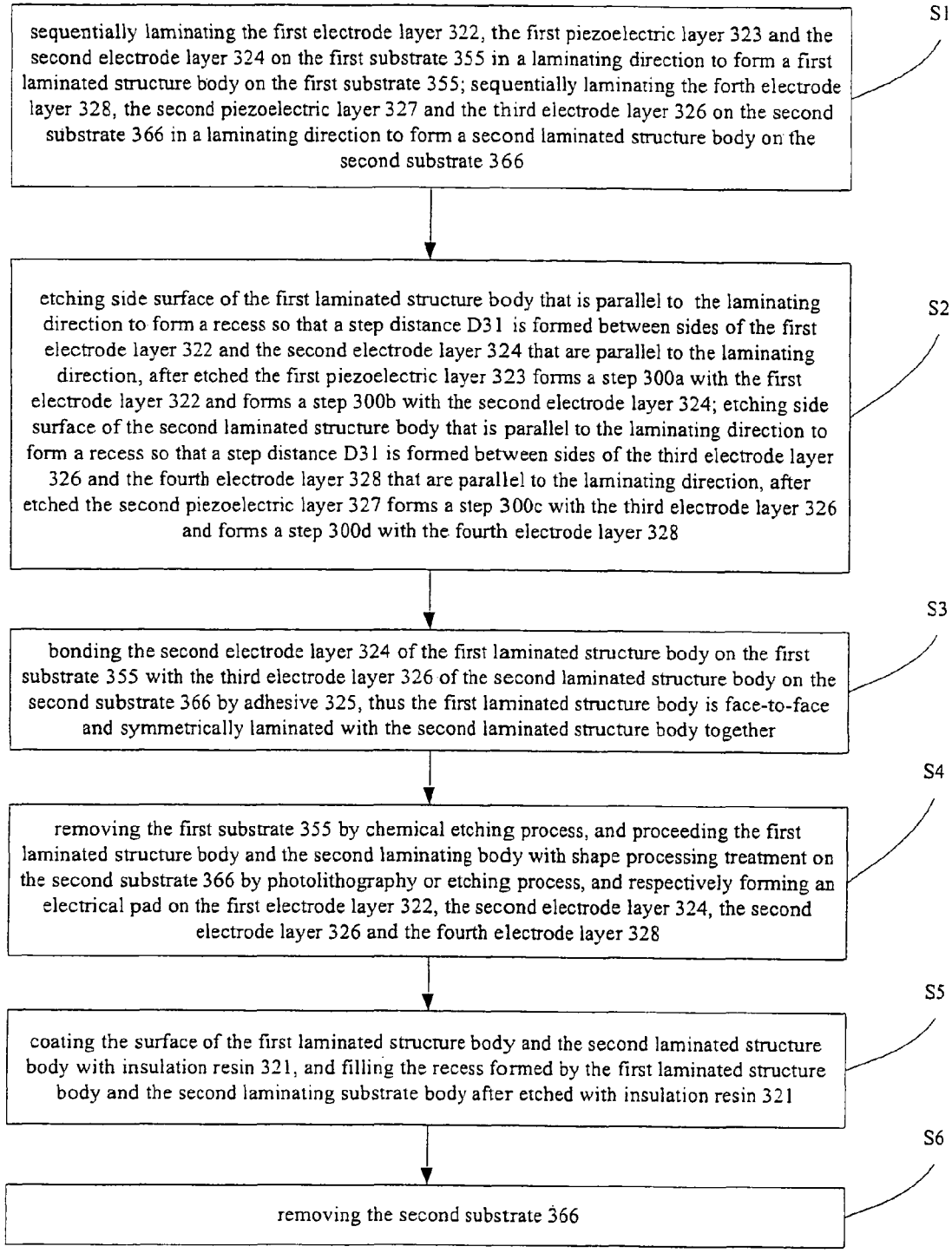
FIG. 6 is a flow chart of the method of manufacturing a piezoelectric element of FIG. 5a-5f.

FIGS. 5a-5f show a method of manufacturing the piezoelectric element according to the present invention. FIG. 6 is a flow chart of the method of manufacturing the piezoelectric element of FIGS. 5a-5f. As shown in FIG. 5a, the first electrode layer 322, the first piezoelectric layer 323 and the second electrode layer 324 are sequentially laminated on the first substrate 355 in a laminating direction to form a first laminated structure body on the first substrate 355; the forth electrode layer 328, the second piezoelectric layer 327 and the third electrode layer 326 are sequentially laminated on the second substrate 366 in a laminating direction to form a second laminated structure body on the second substrate 366 (FIG. 6, step S1). As shown in FIG. 5b, side surface of the first laminated structure body that is parallel to the laminating direction is etched to form a recess so that a step distance D31 is formed between sides of the first electrode layer 322 and the second electrode layer 324 that are parallel to the laminating direction, after etched the first piezoelectric layer 323 forms a step 300a with the first electrode layer 322 and forms a step 300b with the second electrode layer 324; side surface of the second laminated structure body that is parallel to the laminating direction is etched to form a recess so that a step distance D31 is formed between sides of the third electrode layer 326 and the fourth electrode layer 328 that are parallel to the laminating direction, after etched the second piezoelectric layer 327 forms a step 300c with the third electrode layer 326 and forms a step 300d with the fourth electrode layer 328 (FIG. 6, step S2). As show in FIG. 5c, the second electrode layer 324 of the first laminated structure body on the first substrate 355 is bonded with the third electrode layer 326 of the second laminated structure body on the second substrate 366 by adhesive 325, thus the first laminated structure body is face-to-face and symmetrically laminated with the second laminated structure body together (FIG. 6, step S3). As shown in FIG. 5d, the first substrate 355 is removed by chemical etching process, and the first laminated structure body and the second laminating body are proceeded with shape processing treatment on the second substrate 366 by photolithography or etching process, and the first electrode layer 322, the second electrode layer 324, the second electrode layer 326 and the fourth electrode layer 328 respectively form an electrical pad (FIG. 6, step S4). As shown in FIG. 5e, the surface of the first laminated structure body and the second laminated structure body are coated with insulation resin 321, and the recess formed by the first laminated structure body and the second laminating substrate body after etched are also filled with insulation resin 321 (FIG. 6, step S5). As shown in FIG. 5f, the second substrate 366 is removed (FIG. 6, step S6).

Figure 7:
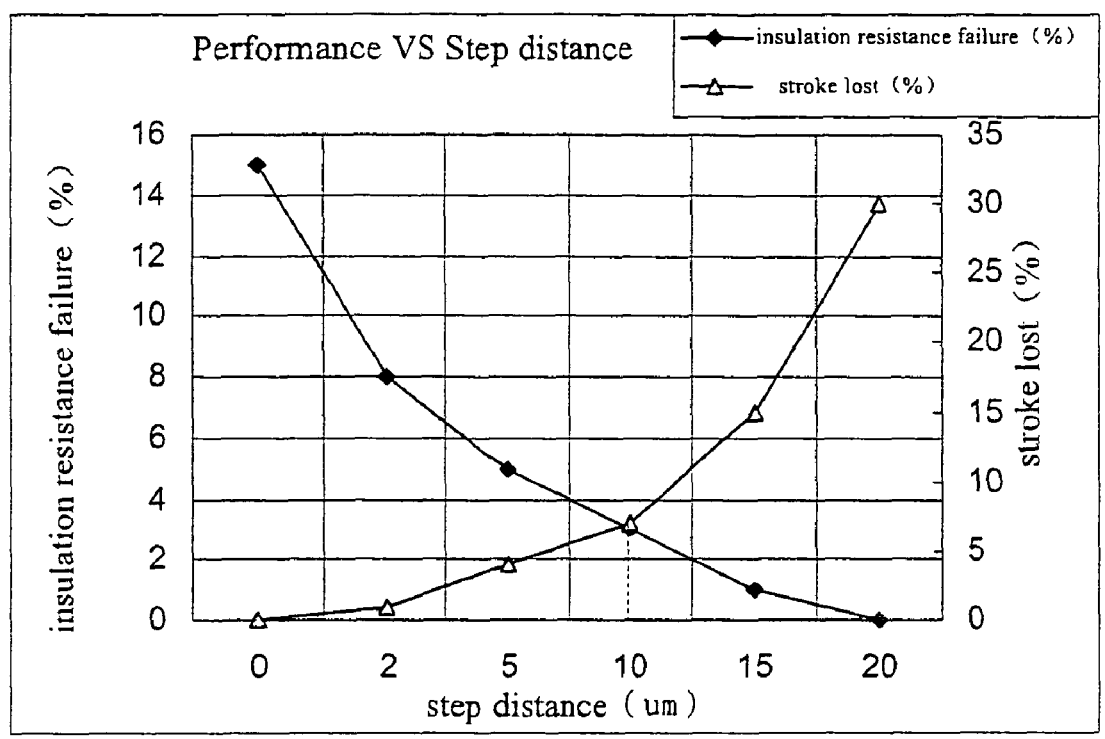
FIG. 7 illustrates performance test data of a piezoelectric element of the present invention.

FIG. 7 illustrates operation test data of the piezoelectric element of the present invention. As shown, the insulation resistance failure of the piezoelectric element reduces as the step distance increases, while the stroke lost increases as the step distance increases. Therefore, the step distance is preferably 10 micrometers in order to take into consideration of both the insulation resistance failure and the stroke lost.

Figure 8A:
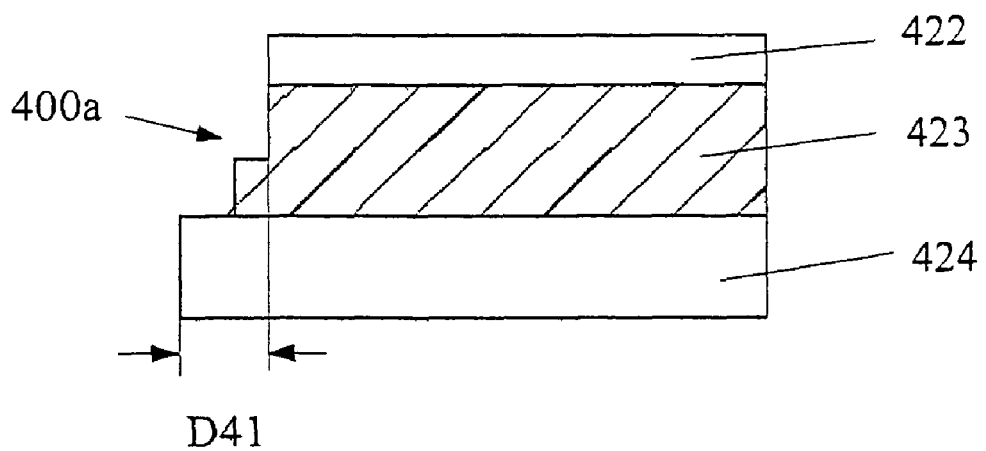
FIG. 8a is a sectional view of a piezoelectric element according to a second embodiment of the present invention.

FIG. 8a is a sectional view of a second embodiment of a piezoelectric element 420 according to the present invention. As shown, the piezoelectric element 420a comprises a laminated structure body and the laminated structure body is laminated by electrode layer and piezoelectric layer alternately to define a laminating direction, and each piezoelectric layer is sandwiched between two adjacent electrode layers. Specifically, the laminated structure body comprises a piezoelectric layer 423, a first electrode layer 422 and a second electrode layer 424 which are positioned on two opposite surfaces of the piezoelectric layer 423. Side surface of the laminated structure body that is parallel to the laminating direction has a portion etched to form a recess so that a step distance D41 is formed between sides of the two adjacent electrode layers 422, 424 that are parallel to the laminating direction. The step distance D41 is preferably 10 micrometers. In the subject embodiment, the side surface is etched into step-shaped surface. More specifically, after etched, the piezoelectric layer 423 together with the second electrode layer 424 forms a two-layer step 400a on the side surface.

Figure 8B:
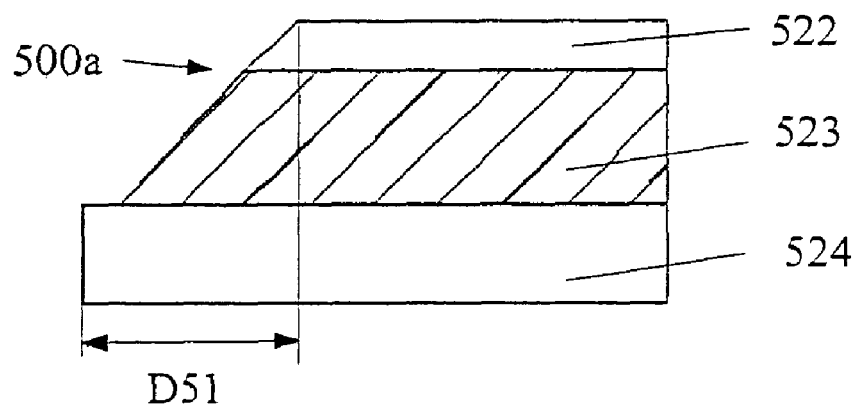
FIG. 8b is a sectional view of a piezoelectric element according to a third embodiment of the present invention.

FIG. 8b is a sectional view of a third embodiment of a piezoelectric element 520 according to the present invention. As shown, the piezoelectric element 520a comprises a laminated structure body and the laminated structure body is laminated by electrode layer and piezoelectric layer alternately to define a laminating direction, and each piezoelectric layer is sandwiched between two adjacent electrode layers. Specifically, the laminated structure comprises a piezoelectric layer 523, a first electrode layer 522 and a second electrode layer 524 which are positioned on two opposite surfaces of the piezoelectric layer 523. Side surface of the laminated structure body that is parallel to the laminating direction has a portion etched to form a recess so that a step distance D51 is formed between sides of the two adjacent electrode layers 522, 524 that are parallel to the laminating direction. The step distance D51 is preferably 10 micrometers. In the subject embodiment, the side surface is etched into inclined surface 500a.

Figure 8C:
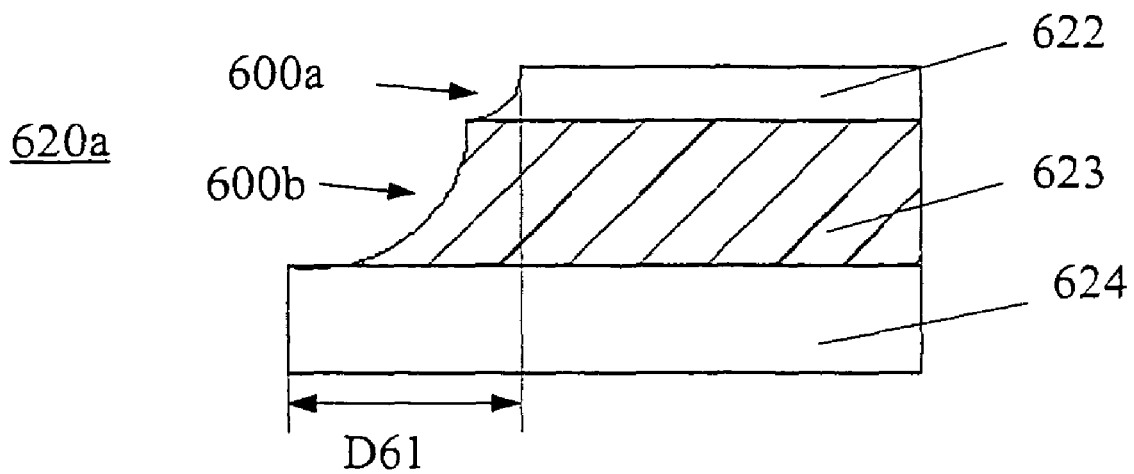
FIG. 8c is a sectional view of a piezoelectric element according to a fourth embodiment of the present invention.

FIG. 8c is a sectional view of a fourth embodiment of a piezoelectric element 620 according to the present invention. As shown, the piezoelectric element 620a comprises a laminated structure body and the laminated structure body is laminated by electrode layer and the piezoelectric layer alternately to define a laminating direction, and each piezoelectric layer is sandwiched between two adjacent electrode layers. Specifically, the laminated structure comprises a piezoelectric layer 623, a first electrode layer 622 and a second electrode layer 624 which are positioned on two opposite surfaces of the piezoelectric layer 623. Side surface of the laminated structure body that is parallel to the laminating direction has a portion etched to form a recess so that a step distance D61 is formed between sides of the two adjacent electrode layers 622, 624 that are parallel to the laminating direction. The step distance D61 is preferably 10 micrometers. In the subject embodiment, the side surface is etched into wave-shaped surface. More specifically, after etched, the first electrode layer 622 together with the piezoelectric layer 623 forms a curved surface 600a on the side surface, and the piezoelectric layer 623 together with the second electrode layer 624 forms a curved surface 600b on the side surface. The curved surface 600a and the curved surface 600b together form the wave-shaped surface.

Figure 8D:
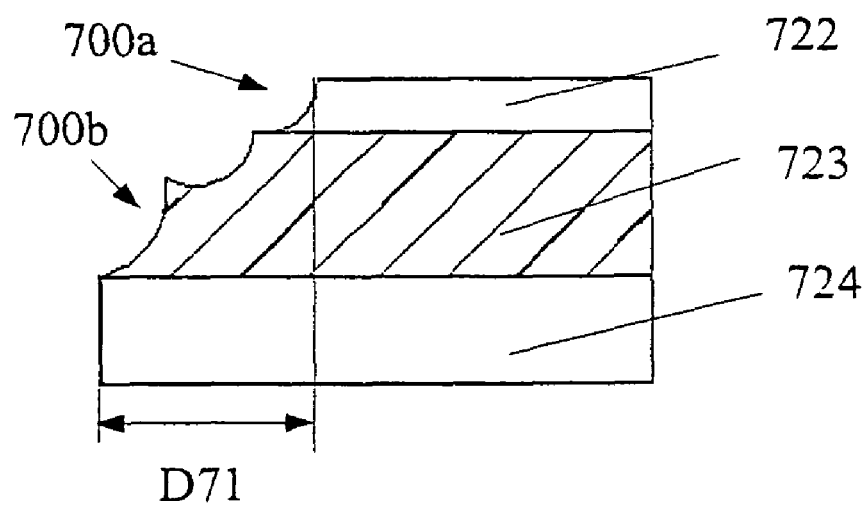
FIG. 8d is a sectional view of a piezoelectric element according to a fifth embodiment of the present invention.

FIG. 8d is a sectional view of a fifth embodiment of a piezoelectric element 720 according to the present invention. As shown, the piezoelectric element 720a comprises a laminated structure body and the laminated structure body is laminated by electrode layer and the piezoelectric layer alternately to define a laminating direction, and each piezoelectric layer is sandwiched between two adjacent electrode layers. Specifically, the laminated structure comprises a piezoelectric layer 723, a first electrode layer 722 and a second electrode layer 724 which are positioned on two opposite surfaces of the piezoelectric layer 723. Side surface of the laminated structure body that is parallel to the laminating direction has a portion etched to form a recess so that a step distance D71 is formed between sides of the two adjacent electrode layers 722, 724 that are parallel to the laminating direction. The step distance D71 is preferably 10 micrometers. In the subject embodiment, the side surface is also etched into wave-shaped surface. More specifically, after etched, the first electrode layer 722 together with the piezoelectric layer 723 forms a curved surface 700a on the side surface, and the piezoelectric layer 723 together with the second electrode layer 724 forms a curved surface 700b on the side surface. The curved surface 700a and the curved surface 700b together form the wave-shaped surface. Unlike the wave-shaped surface of the fourth embodiment mentioned above, the curved surface 700a, 700b could be casual bends.

Figure 9:
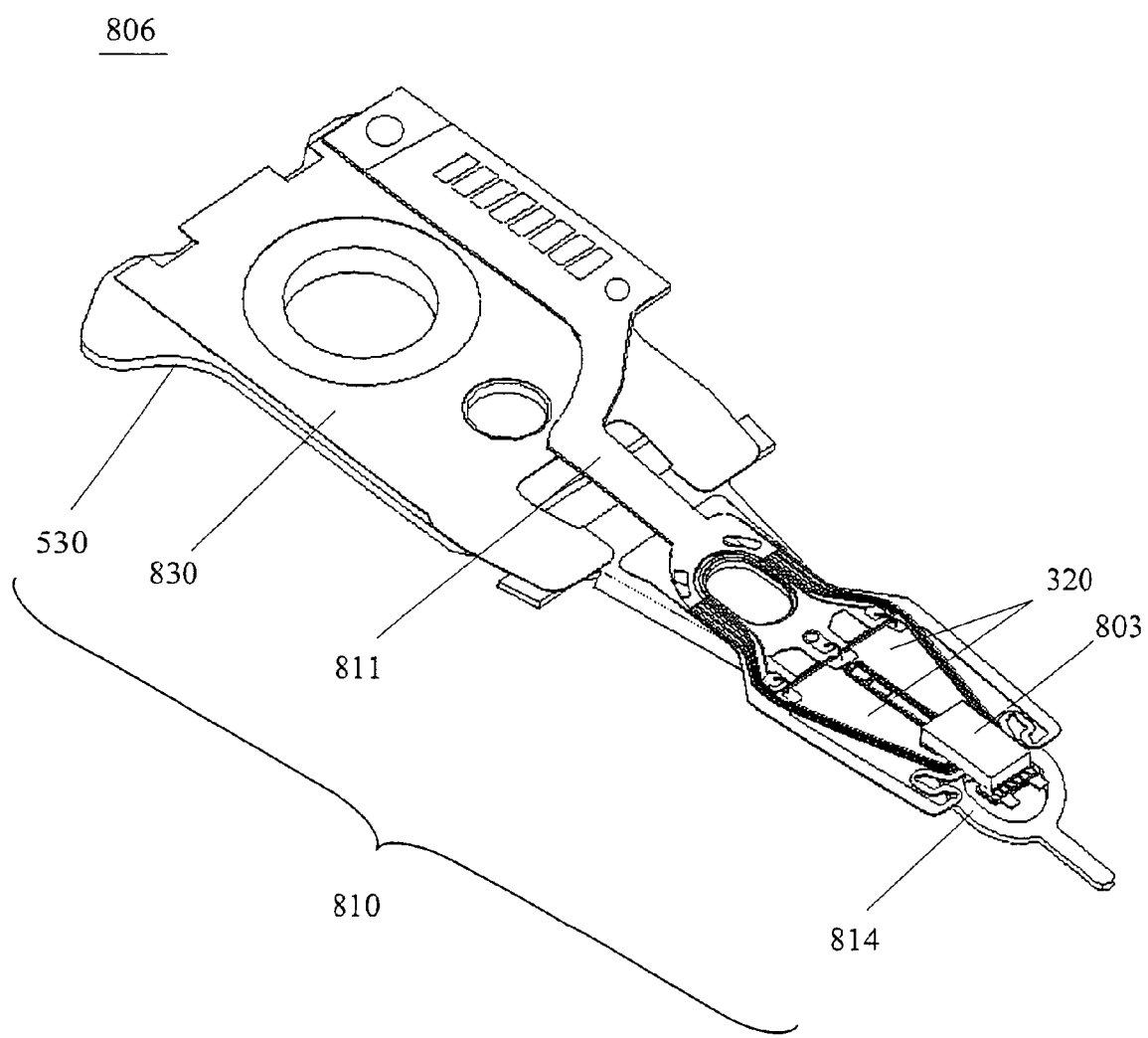
FIG. 9 is a perspective view of a head gimbal assembly according to the present invention.

FIG. 9 is a perspective view of an embodiment of a head gimbal assembly 806 according to the present invention. Referring to FIG. 9, the head gimbal assembly 806 generally comprises a slider 803, a micro-actuator with two piezoelectric elements 320, and a suspension 810 to load or support the slider 803 and the piezoelectric elements 320. The suspension 810 includes a load beam 814, a base plate 530, a hinge 830, and a flexure 811, all of which are assembled together. The load beam 814 is connected to the base plate 530 by the hinge 830, and the flexure 811 runs from the hinge 830 to the load beam 814. One end of the load beam 814 is coupled to the base plate 530 which is swaged to the drive arm (not shown), and the other end of the load beam 814 supports the tongue region of the flexure 811. The piezoelectric elements 320 possess the same characteristics as mentioned above. That is, each piezoelectric element 320 comprises a first laminated structure body and a second laminated structure body. The first and the second laminated structure bodies are both laminated by electrode layer and piezoelectric layer alternately to define a laminating direction, and each piezoelectric layer is sandwiched between two adjacent electrode layers. Side surfaces of the first and the second laminated structure bodies that are parallel to the laminating direction both have at least a portion etched to form a recess so that a step distance is formed between sides of the two adjacent electrode layers that are parallel to the laminating direction. The first and the second laminated structure bodies are symmetrically laminated and bonded together.

Figure 10:
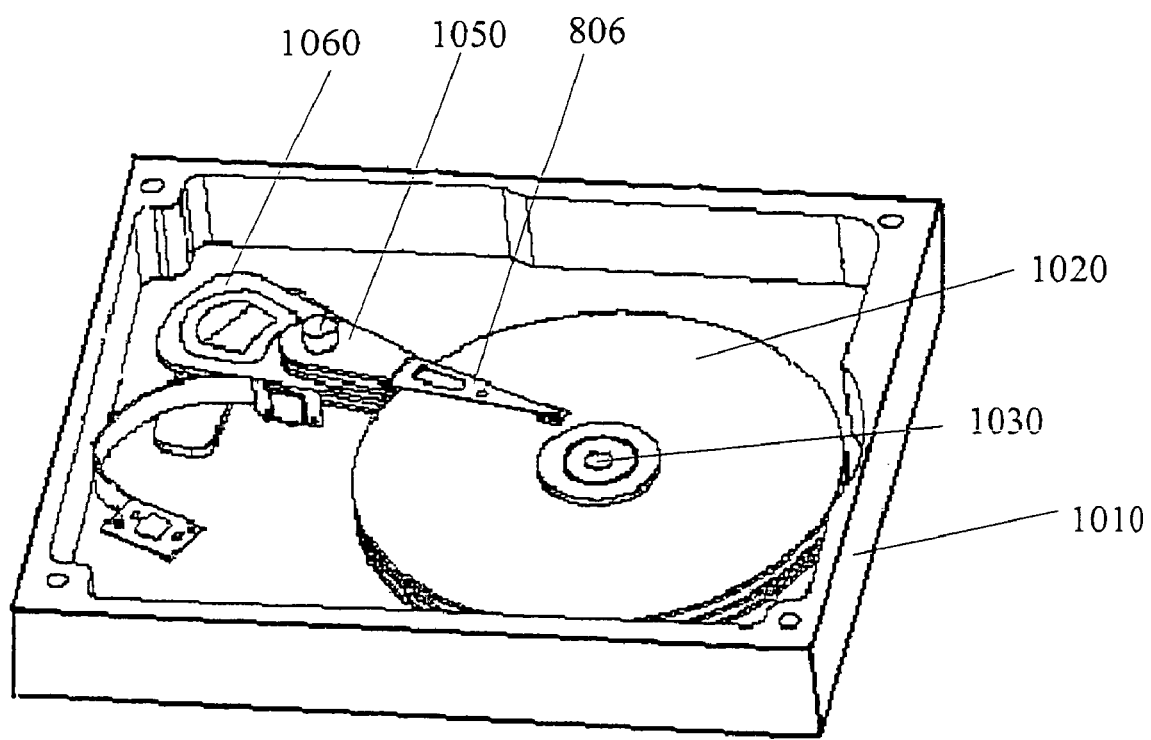
FIG. 10 is a perspective view of a disk drive unit according to the present invention.

FIG. 10 illustrates a disk drive unit according to an embodiment of the present invention. As shown in FIG. 10, the disk drive unit can be attained by assembling a cover 1010, a disk 1020, a spindle motor 1030 to spin the disk 1020, a voice coil motor 1060 and a drive arm 1050 with the head gimbal assembly 806. Because the structure and/or assembly process of disk drive unit of the present invention are well known to persons ordinarily skilled in the art, a detailed description of such structure and assembly is omitted herefrom.

The foregoing description of the present invention has been presented for purposes of illustration and description. It is not intended to be exhaustive or limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A piezoelectric element, comprising:
    a first laminated structure body and a second laminated structure body, the first and the second laminated structure bodies both being laminated by electrode layer and piezoelectric layer alternately to define a laminating direction, and each piezoelectric layer being sandwiched between two adjacent electrode layers,
    wherein side surfaces of the first and the second laminated structure bodies that are parallel to the laminating direction both have at least a portion etched to form a recess so that a step distance is formed between sides of the two adjacent electrode layers that are parallel to the laminating direction, and the first and the second laminated structure bodies are symmetrically laminated and bonded together, and
    wherein the step distance is from 0.5 micrometers to 10 micrometers.

2. The piezoelectric element according to claim 1, wherein the side surfaces of the first and the second laminated structure bodies are etched into step-shaped surfaces, wave-shaped surfaces or inclined surfaces.

3. The piezoelectric element according to claim 1, wherein the recess is filled with insulation resin therein.

4. A head gimbal assembly, comprising:
    a slider;
    a PZT micro-actuator; and
    a suspension to support the slider and the PZT micro-actuator;
    wherein the PZT micro-actuator comprises at least one pair of piezoelectric elements, each piezoelectric element comprises a first laminated structure body and a second laminated structure body, the first and the second laminated structure bodies both being laminated by electrode layer and piezoelectric layer alternately to define a laminating direction, and each piezoelectric layer being sandwiched between two adjacent electrode layers, wherein side surfaces of the first and the second laminated structure bodies that are parallel to the laminating direction both have at least a portion etched to form a recess so that a step distance is formed between sides of the two adjacent electrode layers that are parallel to the laminating direction, and the first and the second laminated structure bodies are symmetrically laminated and bonded together, and wherein the step distance is from 0.5 micrometers to 10 micrometers.

5. The head gimbal assembly according to claim 4, wherein the side surfaces of the first and the second laminated structure bodies are etched into step-shaped surfaces or wave-shaped surfaces or inclined surfaces.

6. The head gimbal assembly according to claim 4, wherein the recess is filled with insulation resin therein.

7. A disk drive unit, comprising:
   a head gimbal assembly;
   a drive arm connected to the head gimbal assembly;
   a disk; and
   a spindle motor to spin the disk;
   wherein the head gimbal assembly comprises:
      a slider;
      a PZT micro-actuator; and
      a suspension to support the slider and the PZT micro-actuator,
   wherein the PZT micro-actuator comprises at least one pair of piezoelectric elements, each piezoelectric element comprises a first laminated structure body and a second laminated structure body, the first and the second laminated structure bodies both being laminated by electrode layer and piezoelectric layer alternately to define a laminating direction, and each piezoelectric layer being sandwiched between two adjacent electrode layers,
   wherein side surfaces of the first and the second laminated structure bodies that are parallel to the laminating direction both have at least a portion etched to form a recess so that a step distance is formed between sides of the two adjacent electrode layers that are parallel to the laminating direction, and the first and the second laminated structure bodies are symmetrically laminated and bonded together, and
   wherein the step distance is from 0.5 micrometers to 10 micrometers.

8. A method of manufacturing a piezoelectric element, the method comprising:
   (1) forming a first laminated structure body by laminating electrode layer and piezoelectric layer alternately in a laminating direction, wherein each piezoelectric layer is sandwiched between two adjacent electrode layers;
   (2) etching a side surface of the first laminated structure body that is parallel to the laminating direction to form a recess so that a step distance is formed between sides of the two adjacent electrode layers that are parallel to the laminating direction;
   (3) forming a second laminated structure body as in (1) and (2); and
   (4) laminating together, in face-to-face and symmetrical orientation, the first laminated structure body and the second laminated structure body, and bonding the first laminated structure body and the second laminated structure body,
   wherein the step distance is from 0.5 micrometers to 10 micrometers.

9. The method of manufacturing a piezoelectric element according to claim 8, further comprising filling the recess with insulation resin.

10. The method of manufacturing a piezoelectric element according to claim 8, wherein the side surface is etched into step-shaped surface, wave-shaped surface or inclined surface in (2).

11. The method of manufacturing a piezoelectric element according to claim 8, wherein the etching is performed by chemical etching or sputtering.

* * * * *